April 4, 1950     J. R. ALBRIGHT     2,503,086
ROTARY SHAFT SEAL
Filed Jan. 26, 1946
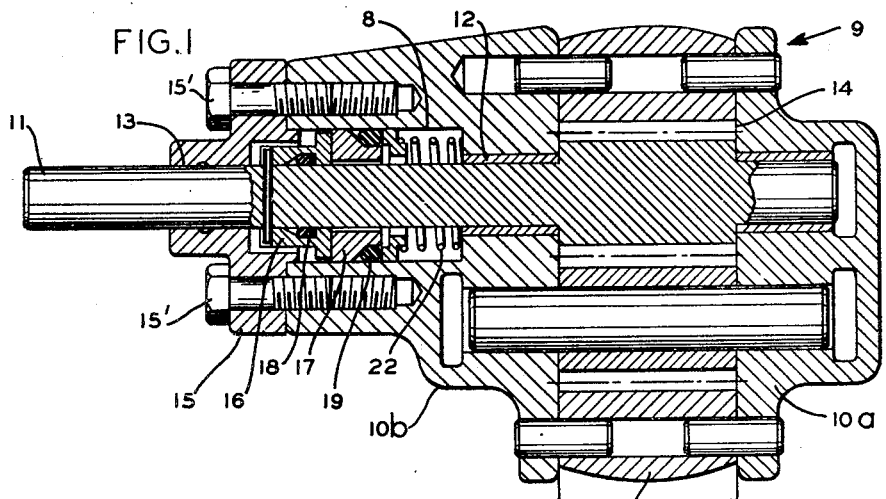
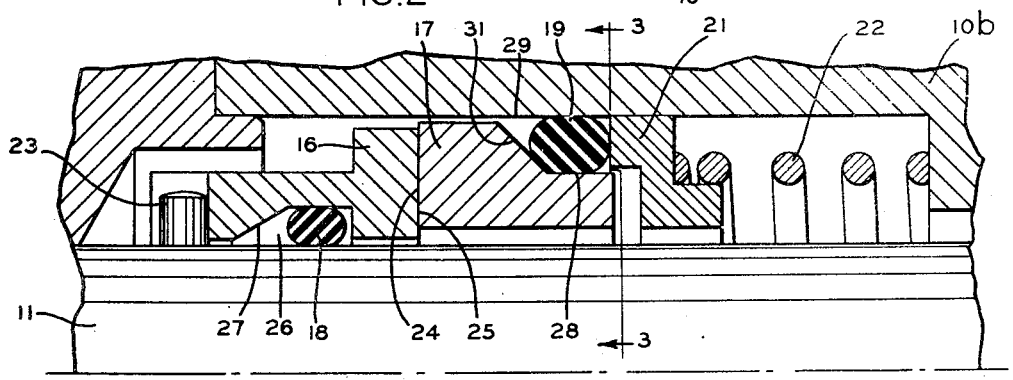
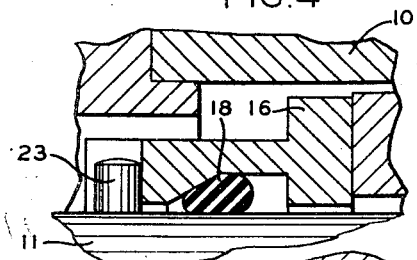
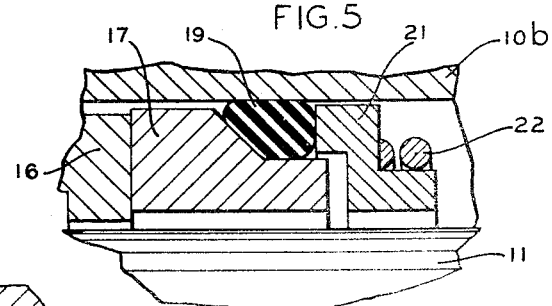
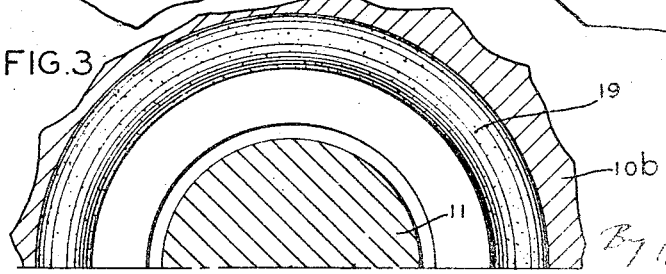
INVENTOR
John R. Albright
By McCanna & Morsbach
Attys Patented Apr. 4, 1950

2,503,086

UNITED STATES PATENT OFFICE 2,503,086

ROTARY SHAFT SEAL

John R. Albright, Rockford, Ill., assignor to Geo. D. Roper Corporation, Rockford, Ill., a corporation of Illinois Application January 26, 1946, Serial No. 643,668

1 Claim. (Cl. 286—11.15)

This invention relates to rotary shaft seals.

Heretofore rotary shaft seals have been used in which the seal against fluid pressure was effected by means including a ring type rubber or synthetic rubber sealing member. Seals of this kind have been unsatisfactory when applied under certain conditions, such as pumping fuel oils, where it has been found that such sealing members become soft and their swelling tends to move in a direction that was detrimental to the seal. Another disadvantage in rotary shaft seals was that the alignment of metallic sealing members was very critical and had to be almost perfect because of inability of such members to flex under conditions usually occasioned by disalignment of the rotary shaft with respect to its housing or bearings.

The present invention aims to overcome these objections by the provision of a rotary shaft seal novel construction characterized by the use of resilient sealing rings applied in such manner as to accommodate disalignment conditions and to maintain pressure tight sealing effects over long periods of use and under a wide variety of pumping conditions both as to pressures and materials being pumped.

Another object of my invention is to provide a rotary shaft seal of improved construction designed for application in the space commonly used for a stuffing box packing. My invention contemplates removability and replacement of the sealing means.

Another object is to provide a rotary shaft seal of the character described which will automatically accommodate itself to irregularities in alignment of the parts without impairing the sealing function.

Another object is to provide a rotary shaft seal of the character described constructed in such novel manner as to permit of manufacture at a comparatively low cost.

Other objects and attendant advantages will be appreciated by those skilled in this art as the invention becomes better understood by reference to the following description when considered in connection with the accompanying drawings, in which:

Figure 1 is a longitudinal section through a rotary gear pump showing sealing means according to my invention applied to the rotary drive shaft;

Figure 2 is an enlarged sectional view lengthwise through the sealing means, showing one half the structure, the remaining half being a duplicate thereof;

Figure 3 is a section taken on the section line 3—3 of Figure 2;

Figures 4 and 5 are detail sections showing a first sealing ring in a normal condition as in Figure 4 and in a compression condition as in Figure 5.

The sealing means of my invention is here shown applied in the stuffing box 8 of a rotary gear pump designated generally by 9 having a rotary drive shaft 11 which passes through the chamber 8 and has bearing support in an inner bearing 12 and an outer bearing 13. In this instance the sealing means is designed to effectively prevent escape of liquid or fluid under pressure from the gear chamber 14 lengthwise along the shaft or otherwise through the chamber 12 and out through the bearing 13. In this case the bearing 13 is carried by a removable cover plate 15 which is normally clamped to the pump casing by means of screws (not shown).

The sealing means comprises, generally stated, a rotating seal head 16, a seal head 17 held against rotation, seal rings 18 and 19, a pressure ring 21, and a compression spring 22. The seal head 16 is connected by suitable means such as a pin 23 to rotate with the shaft but preferably has slight clearance on the shaft to permit it to have flexibility thereon. The seal head has at its inner end a flat lapped sealing face 24 normal to the shaft. The stationary seal ring 17 has a flat lapped sealing face 25 complemental to the face 24 and urged into sealing engagement therewith, as will be presently described. The head 16 is provided with an internal groove 26 having a frusto-conical seal surface 27 at the end of the groove remote from the sealing face 24 and converging in a direction away from the chamber 14 or the pressure source. The ring 18 is of resilient material such as rubber or synthetic rubber normally round in cross-section and of a size to be compressed between the shaft and the seal head 16 when positioned in the groove with the parts in a normal position shown in Figures 2 and 4, either at rest or at zero pressure. This ring 18 normally provides a seal against escape of pressure along the shaft. When the pressure from within the pump increases, the ring 18 is moved lengthwise along the shaft into wedging engagement between the shaft and the surface 27 is distorted into effective sealing engagement therewith, as shown in Figure 5. The ring 19 is similar to the ring 18 but larger in diameter and in cross-section and is normally compressed between the outer surface 28 of the seal head 17 and the internal surface 29 of the stuffing box chamber, thus providing a seal against pressure outwardly at the periphery of the seal head 17. The ring 19 is normally urged by the spring 22 and thrust ring 21 against a frusto-conical surface 31 formed on the seal head 17, as shown in Figures 2 and 5. This condition exists at zero pressure within the pump chamber. The ring 19 is moved in response to increase in pressure within the pump chamber and the stuffing box, in a wedging engagement against the surface 29 and 31. The rotating seal head 16 and the stationary head 17 are, respectively, of different materials such as steel against bronze, or steel against graphite, or graphite against bronze, or other combinations making for good bearing seal.

In the normal condition with zero or low pressure within the pump the parts are in the position shown in Figures 2, 4, and 5. In this condition the shaft may be at rest or rotating. The seal effected by the seal rings 18 and 19 and the sealing faces 24—25 prevents escape of fluids of any kind from the pressure side of the seal heads to the outer side thereof, and consequently there is no escape of fluids through the shaft bearing 13. Upon increase in internal pressure the sealing effects are increased, that is, between the ring 18 and its wedging surfaces, the ring 19 and its wedging surfaces, and the sealing surfaces 24—25. There is no appreciable rubbing wear between the rubber rings and their seal surfaces, the only friction being at the lapped bearing faces between the rotating head 16 and the stationary head 17. The construction is particularly well suited to accommodate any irregularities in manufacture or disalignments in the shaft mounting or in the seal heads, since each head is free or flexible to accommodate any such variances while still maintaining the surfaces 24—25 in tight sealing engagement. Another advantage of my invention is that in the event of swelling, or distortion or deterioration of the rings 18—19 incidental to extremely long use or from the effects of acids, oils, and different chemicals being pumped, the rings will function effectively so long as there is any body left. It will also be observed that the parts are easily replaceable upon removing the end bearing 13 and the pin 23. A further advantage is the comparatively low cost of manufacture, since all parts except the rubber rings and the spring can be machined on automatic screw machines, thus eliminating expensive machining operations necessary in prior seals. Furthermore, the sealing means of my invention will fit in the same bore as that commonly used for the packing of a stuffing box. The pump or other structure need not, therefore, be of special construction in order to utilize my sealing means, and no special adaptors are required.

What is claimed is:

Means for sealing a rotary shaft against the escape of fluid under pressure from a housing in which the shaft has a bearing at a point on the shaft remote from the source of pressure, comprising a seal head defined by a solid unitary body mounted on the shaft and provided at one end with a bearing surface normal to the shaft and having an inner seal ring groove intermediate its ends provided at its end remote from said bearing surface with an internal frusto-conical surface converging in a direction away from the source of pressure, means acting between said seal head and the shaft for positively securing the seal head on the shaft to rotate in unison with the latter a second seal head surrounding the shaft normally stationary with respect to rotation and free to move lengthwise of the shaft, said second seal head provided with a bearing surface complemental to that of the first seal head and adapted to have sealing engagement therewith and having an external frusto-conical surface at its end remote from its said bearing surface providing one wall of a seal ring groove between the periphery of the second seal head and an internal surface of the housing, a resilient seal ring disposed in the first mentioned groove normally held under axial compression between the first seal head and the shaft, a second resilient seal ring normally under radial compression between the second seal head and the housing, the first seal ring being displaceable into wedging engagement between the shaft and said internal frusto-conical surface in response to said internal pressure, and means exerting pressure against the second seal ring in a direction lengthwise of the shaft to displace said second seal ring into sealing engagement between said external frusto-conical surface and said internal wall of the housing, said means simultaneously exerting said pressure through the second seal ring against the second seal head to urge its said bearing surface into said sealing engagement with said bearing surface on the first seal head.

JOHN R. ALBRIGHT.

REFERENCES CITED

The following references are of record in the file of this patent:

UNITED STATES PATENTS

| Number | Name | Date |
|---|---|---|
| 1,342,131 | Mycock | June 1, 1920 |
| 1,644,489 | Pitman | Oct. 4, 1929 |
| 1,943,227 | Parker | Jan. 9, 1934 |
| 2,259,422 | Karlberg | Oct. 14, 1941 |
| 2,362,854 | Stephens | Nov. 14, 1944 |
| 2,401,379 | Smith | June 4, 1946 |
| 2,405,464 | Storer | Aug. 6, 1946 |

FOREIGN PATENTS

| Number | Country | Date |
|---|---|---|
| 379,210 | Great Britain | of 1932 |